United States Patent
Jean et al.

(10) Patent No.: US 8,595,076 B2
(45) Date of Patent: Nov. 26, 2013

(54) METHOD AND SYSTEM FOR PURCHASE OF A PRODUCT OR SERVICE USING A COMMUNICATION NETWORK SITE

(76) Inventors: Donald C. Jean, Easton, PA (US); Thomas J. Middleton, Somerville, NJ (US)

(*) Notice: Subject to any disclaimer, the term of this patent is extended or adjusted under 35 U.S.C. 154(b) by 784 days.

(21) Appl. No.: 12/322,147

(22) Filed: Jan. 29, 2009

(65) Prior Publication Data

US 2009/0210315 A1 Aug. 20, 2009

Related U.S. Application Data

(60) Provisional application No. 61/062,953, filed on Jan. 30, 2008.

(51) Int. Cl.
*G06Q 20/00* (2012.01)
(52) U.S. Cl.
USPC ................................. 705/26; 705/27
(58) Field of Classification Search
USPC ............................................................ 705/26
See application file for complete search history.

(56) References Cited

U.S. PATENT DOCUMENTS

| | | | | |
|---|---|---|---|---|
| 6,055,513 A | * | 4/2000 | Katz et al. ................ | 705/26.41 |
| 6,092,053 A | * | 7/2000 | Boesch et al. ............. | 705/26.8 |
| 6,389,402 B1 | * | 5/2002 | Ginter et al. ................ | 705/51 |
| 6,427,140 B1 | * | 7/2002 | Ginter et al. ................ | 705/80 |
| 7,647,252 B2 | * | 1/2010 | Rampell et al. ............. | 705/26.4 |
| 7,860,753 B2 | * | 12/2010 | Walker et al. ............... | 705/26.1 |
| 7,991,681 B2 | * | 8/2011 | Dort ............................ | 705/37 |
| 2002/0002513 A1 | * | 1/2002 | Chiasson ..................... | 705/27 |
| 2003/0105688 A1 | | 6/2003 | Brown et al. | |
| 2006/0195367 A1 | * | 8/2006 | Allfred et al. ................ | 705/26 |
| 2007/0198406 A1 | | 8/2007 | Bishop et al. | |
| 2008/0183593 A1 | * | 7/2008 | Dierks ......................... | 705/26 |

OTHER PUBLICATIONS

International Search Report, PCT/US2009/00578, dated Mar. 5, 2009.

* cited by examiner

*Primary Examiner* — Garcia Ade
(74) *Attorney, Agent, or Firm* — H. Jay Spiegel

(57) ABSTRACT

An item available for purchase on a communication site of a server may become the subject of a contract for purchase entered into between a purchasing party and a purchasee offering the item for purchase on the site, based on the purchasing party and potential purchasees exchanging information on the communication site. Funds of the purchasing party for use to satisfy the contract are controlled by the server, and a portion of the funds is paid to the purchasee or returned to the purchasing party of the contract, in accordance with payment release information received at the server.

32 Claims, 11 Drawing Sheets

METHOD AND SYSTEM FOR PURCHASE OF A PRODUCT OR SERVICE USING A COMMUNICATION NETWORK SITE

CROSS REFERENCE TO RELATED APPLICATION

This application claims the benefit of the filing date of U.S. Provisional Application No. 61/062,953 filed Jan. 30, 2008, the disclosure of which is hereby incorporated herein by reference.

BACKGROUND OF THE INVENTION

Currently, each year U.S. consumers spend well over one hundred billion dollars purchasing goods or services (collectively "items") over a communication network ("on-line"), such as from websites on the Internet. For example, items are available for purchase at Internet websites, such as Worldbid.com, Sourcity.com, Ariba.com, Priceline.com, eBay.com, Travelocity.com, etc., which require an individual or entity interested in purchasing an item from, or selling an item on, the website to register with the website. In addition, items are available for purchase at so-called channel websites, which offer for purchase only particular types of items, such as catalog-based goods and services. Purchase transactions completed over the Internet account for less than 3% of the nearly four (4) trillion dollars of annual U.S. retail sales. In addition, it is expected that on-line purchase transactions by U.S. consumers, and consumers located outside the U.S., will continue to increase by 25% and 35% per year, respectively.

It is estimated, however, that just over 50% of those individuals or entities who use the Internet, and are interested in purchasing an item on-line, actually complete a purchase transaction of a desired item on-line. The reasons most often attributed to why an individual or entity who uses the Internet does not complete a purchase on-line include: fear of identity theft; fear of terms and conditions of sale, which are set by the individual or entity selling the item; difficulty in concluding the actual on-line transaction; fear of being cheated or receiving an inferior item; concerns about paying a fair price; concerns about the ability of returning a purchased item for credit; and not having a credit card physically available at the time the information contained on the card is required to complete the on-line transaction.

In particular, it is believed that the control of many, or sometimes all, aspects of the on-line purchase process by the individual or entity who is selling an item on-line is one of the primary reasons why many on-line purchase transactions are not completed. For example, those who offer items for sale on-line often: design, structure and organize the manufacture of a product or the service being offered for sale; set the price of the item; set pricing mechanisms, such as the pricing operation of on-line auctions; establish terms or parameters of the purchase transaction, such as warranties that typically include lengthy and not easily understood legal boilerplate; determine availability of items; control advertising and communications regarding items; target a selected market(s) for sale of a specific item(s); avoid or nullify negotiations for purchase of an item; closely mimic offerings of competitors; and perform other actions designed to maximize profits by channeling, isolating, individualizing, confusing and de-leveraging potential purchasers. This one-sided control of the purchase process serves to weaken, divide and marginalize potential on-line purchasers, thereby causing the potential purchasers, who may have found a desired item on-line, not to complete an on-line purchase transaction.

In addition, those who are ready to purchase a specific item may disfavor the on-line purchasing process because of its inefficiencies and, therefore, not even attempt to make an on-line purchase transaction. Oftentimes, an individual may spend significant amounts of time, in some cases hours, searching for a desired item using numerous search engines and possibly visiting hundreds of websites, and still not find a website offering the desired item for sale. For example, a website on which the desired item is offered for sale may not be uncovered from an on-line search, if the website was not included or given high prominence in the search results provided by a search engine used to search for the item.

Therefore, there exists a need for system and method providing for a purchase transaction process that increases the likelihood that purchase transactions on a communication network are initiated and completed.

SUMMARY OF THE INVENTION

In accordance with one aspect of the present invention, a computer-implemented method for purchase of an item may include receiving, at a communication site of a server including a processor, information relating to purchase of an item available for purchase on the site. The received information includes purchase contract information for a contract for the item entered into between a purchasing party and a purchasee offering the item for sale on the communication site. The processor controls distribution of funds of the purchasing party held in connection with the contract for the item. The processor may pay or return at least a portion of the held funds of the purchasing party, respectively, to the purchasee or the purchasing party, in accordance with payment release information received at the site.

In one embodiment, a purchase code is assigned to the contract, and the distribution of the held funds of the purchasing party is controlled based on receipt by the site of the purchase code or a code obtained from the purchase code.

In a further embodiment, the processor may determine a match between purchasing criteria of a listed item of at least one purchasing party registered with the site and purchasing criteria for sale of an item of each of a plurality of purchasees registered with the site and, upon determination of a match, notify one or more of the purchasees of a match for the listed item.

In accordance with another aspect of the present invention, a system for purchase of an item provides a server including a processor, and the server may be operable for providing a communication site accessible over a communication network. The site may receive information relating to purchase of an item available for purchase on the site, where the received information includes purchase contract information for a contract for the item entered into between a purchasing party and a purchasee offering the item for sale on the site. In addition, the processor may be operable for controlling distribution of funds of the purchasing party held in connection with the contract for the item. At least a portion of the held funds of the purchasing party may be paid to the purchasee or returned to the purchasing party, respectively, in accordance with payment release information received at the site.

BRIEF DESCRIPTION OF THE DRAWINGS

Other objects and advantages of the present invention will be apparent from the following detailed description of the present preferred embodiments, which description should be considered in conjunction with the accompanying drawings in which like reference indicate similar elements and in which:

FIGS. 5-10 are exemplary screen displays in accordance with an aspect of the present invention.

DETAILED DESCRIPTION

Figure 1:
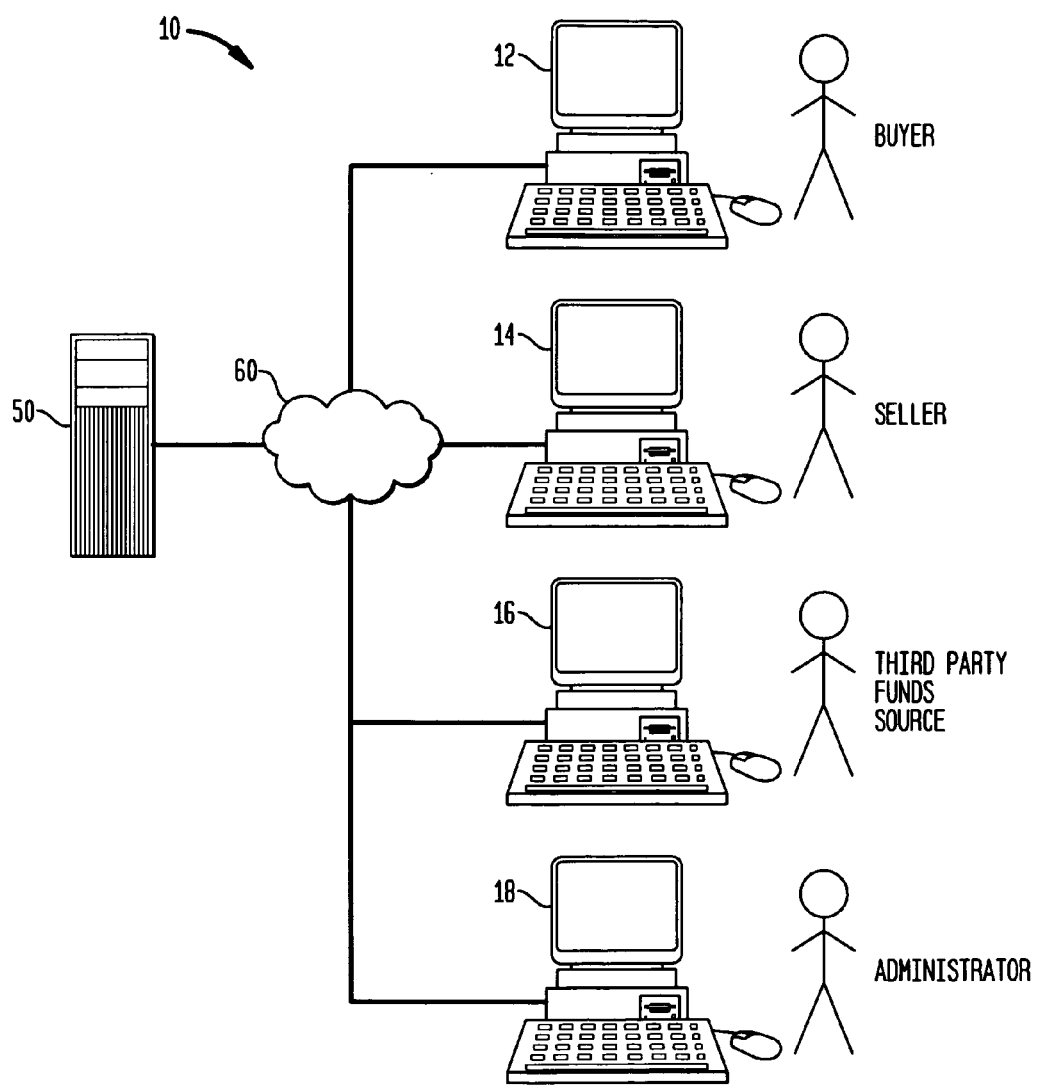
FIG. 1 is a block diagram of a system in accordance with an aspect of the present invention.
Figure 2:
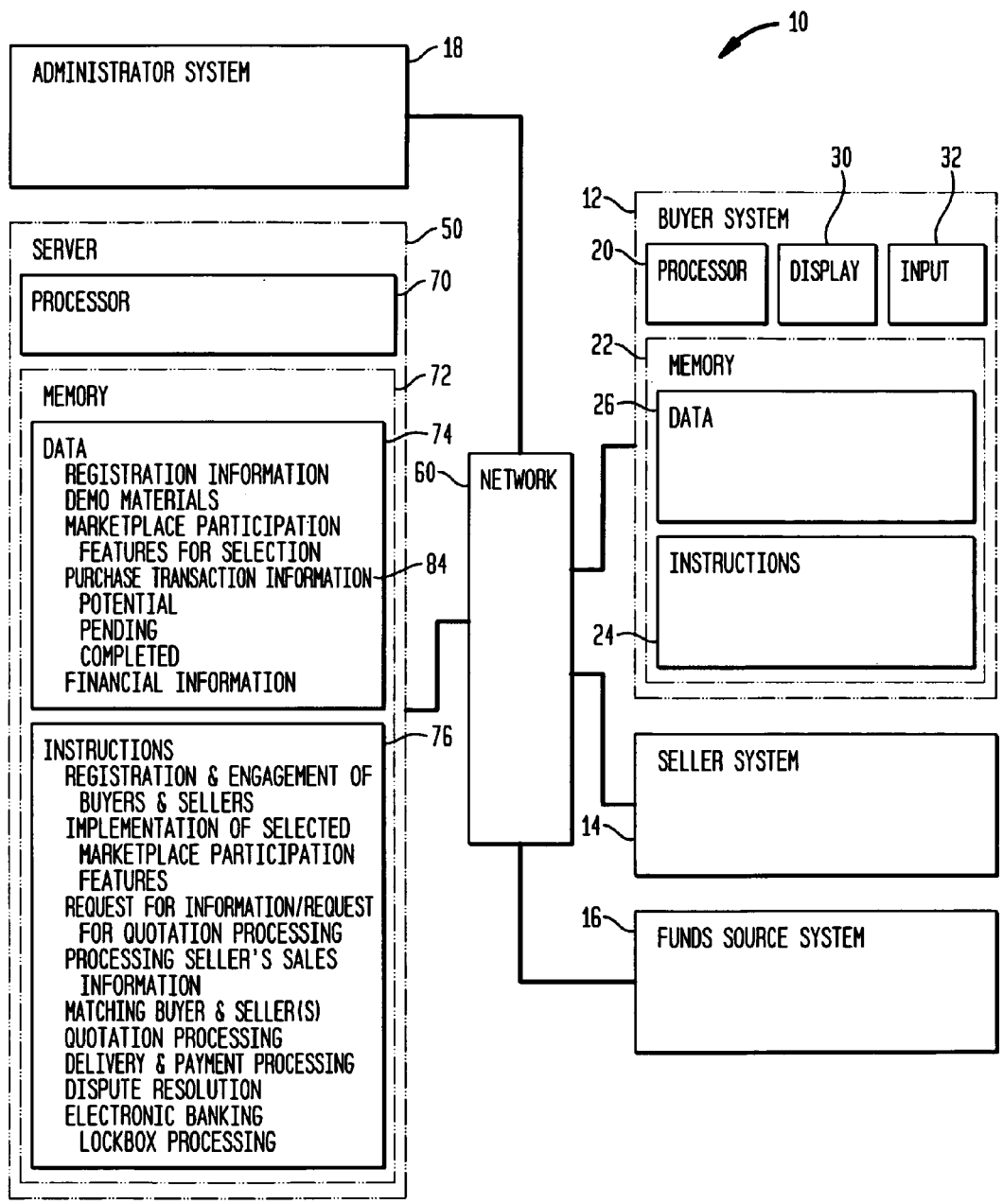
FIG. 2 is a block diagram of an exemplary embodiment of the system of FIG. 1.

In accordance with one aspect of the invention and as shown in FIGS. 1 and 2, a purchase transaction system 10 may supply to an individual or entity who is registered with a transaction website of the system 10 to purchase ("registered buyer") a product or service ("item") using the transaction website, in response to a request by the registered buyer regarding a desired item available for purchase on the transaction website, purchase information on the desired item supplied by an individual or entity registered with the transaction website to sell ("registered seller") an item using the transaction website, and furthermore implement a purchase transaction process, which may include the transaction website controlling payment of the registered seller based on the circumstances of the delivery of the item to the registered buyer, in accordance with terms of a contract for purchase of the item that the registered buyer and registered seller entered into through use of the transaction website. For purposes of brevity, unless otherwise indicated below, reference to a "buyer" means a registered buyer, and reference to a "seller" means a registered seller.

Referring to FIGS. 1 and 2, the system 10 may include client computers 12, 14, 16 and 18 which communicate with a server computer 50 over a communication network 60, such as the Internet. Each of the computers 12, 14, 16, 18 may contain a processor 20, memory 22 and other components typically present in general purpose computers. In addition, the server 50 may contain a processor 70 and a memory 72.

The memory 22 may store information accessible by the processor 20, including instructions 24 that may be executed by the processor 20 and data 26 that may be retrieved, manipulated or stored by the processor 20. Similarly, the memory 72 may store information accessible by the processor 70, including instructions 76 that may be executed by the processor 70 and data 74 that may be retrieved, manipulated or stored by the processor 70. The memory may be of any type capable of storing information accessible by the processor, such as a hard-drive, memory card, ROM, RAM, DVD, CD-ROM, write-capable, read-only memories.

The processors 20, 70 may comprise any number of well known processors, such as processors from Intel Corporation. Alternatively, the processors may be a dedicated controller such as an ASIC.

The instructions 24, 76 may comprise any set of instructions to be executed directly (such as machine code) or indirectly (such as scripts) by the processors 20, 70, respectively. In that regard, the terms "instructions," "steps" and "programs" may be used interchangeably herein. The instructions may be stored in object code form for direct processing by the processor, or in any other computer language including scripts or collections of independent source code modules that are interpreted on demand or compiled in advance. The functions, methods and routines of instructions in accordance with the present invention are explained in more detail below.

The data 26, 74 may be retrieved, stored or modified by the processors 20, 70 in accordance with the instructions 24, 76, respectively. The data may be stored as a collection of data. For instance, although the invention is not limited by any particular data structure, the data may be stored in computer registers, in a relational database as a table having a plurality of different fields and records, XML documents, or flat files. The data may also be formatted in any computer readable format such as, but not limited to, binary values, ASCII or EBCDIC (Extended Binary-Coded Decimal Interchange Code). Moreover, the data may comprise any information sufficient to identify the relevant information, such as descriptive text, proprietary codes, pointers, references to data stored in other memories (including other network locations) or information which is used by a function to calculate the relevant data.

Although the processor and memory are functionally illustrated in FIGS. 1 and 2 within the same block, it will be understood by those of ordinary skill in the art that the processor and memory may actually comprise multiple processors and memories that may or may not be stored within the same physical housing. For example, some of the instructions and data may be stored on removable CD-ROM and others within a read-only computer chip. Some or all of the instructions and data may be stored in a location physically remote from, yet still accessible by, the processor. Similarly, the processor may actually comprise a collection of processors which may or may not operate in parallel.

In one embodiment, each client computer may be a general purpose computer, intended for use by a person, having all the internal components normally found in a personal computer such as a central processing unit (CPU), a display 30, an input 32 such as a CD-ROM drive, mouse, keyboard or microphone, and a hard-drive, speakers, modem and/or router (telephone, cable or otherwise) and all of the components used for connecting these elements to one another. Moreover, computers in accordance with the systems and methods described herein may comprise any device capable of processing instructions and transmitting data to and from humans and other computers, including network computers lacking local storage capability, PDAs with modems and Internet-capable wireless phones. Although the only input means shown in FIG. 1 are the mouse, keyboard and CD-ROM drive, other means for inputting information from a human into a computer are also acceptable such as a microphone, touch-sensitive screen, voice recognition, etc.

The server 50 and the client computers 12, 14, 16, 18 are capable of direct and indirect communication, such as over the network 60. Although only a few client computers and a single server are depicted in FIGS. 1 and 2, it should be appreciated that a typical system 10 may include a large number of connected computers and several servers to which the computers can connect, with each different computer being at a different node of the network. The network, and intervening nodes, may comprise various configurations and protocols including the Internet, intranets, virtual private networks, wide area networks, local networks, private networks using communication protocols proprietary to one or more companies, Ethernet, WiFi and HTTP. Such communication may be facilitated by any device capable of transmitting data to and from other computers, such as modems (e.g., dial-up or cable), networks and wireless interfaces. In one embodiment, the server 50 may be a web server, and the client computers include browsers for facilitating communications with the server 50. Although certain advantages are obtained when information is transmitted or received as noted above, other aspects of the invention are not limited to any particular manner of transmission of information. For example, in some aspects, the information may be sent via a medium such as a disk, tape, CD-ROM.

The information may also be transmitted over a global or private network, or directly between two computer systems, such as via a dial-up modem. In other aspects, the information may be transmitted in a non-electronic format and manually entered into the system.

In an exemplary embodiment, as discussed in detail below, the client computers 12, 14, 16 and 18 may be used, respectively, by a buyer; a seller; an individual or entity which may hold, and provide for electronic transfer of, funds ("third party funds source"); and an individual or entity ("administrator") who may own and/or operate the transaction website provided by the server 50.

Referring to FIG. 2, the data 74 in the server 50 may include information representative of and relating to: registration of a individual or entity as a buyer or seller with the transaction website of the server 50; a demonstration of features of the transaction website, which may be in text or multimedia format; transaction website marketplace participation features selectable by buyers and sellers; potential, pending and completed purchase transactions between buyers and sellers, including delivery and payment information; and financial information relating to electronic banking ("Ebank") services and electronic payment services offered by the transaction website.

The instructions 76 may contain instructions that the processor 70 may execute to control: buyer and seller registration and engagement with the transaction website; processing the marketplace participation features selected by buyers and sellers which may be incorporated into a purchase transaction process for purchasing an item using the transaction website; processing a request for information ("RFI") and a request for a quotation ("RFQ") for an item supplied by a buyer; processing purchase information on an item available for purchase on the transaction website supplied by a seller; supplying an RFI and/or RFQ to a seller based on (i) a determination by the transaction website that an item identified in an RFI and/or RFQ is the same as or substantially corresponds to (collectively "matches") an item offered for sale by a seller, or (ii) an electronic request, such as including a search query, from a seller for review of RFIs and/or RFQs; negotiation of a purchase contract for an item between a buyer and a seller; delivery and payment processing for a purchase contract entered into between a buyer and a seller, which may include the transaction website holding funds of a buyer in an account ("lockbox account") and controlling distribution of the held funds from the lockbox account to the seller based on the circumstances of the delivery of the purchased item to the buyer; providing for resolution of a dispute regarding a purchase contract; and providing financial and banking-related services for the Ebank. The processor 70 performs the instructions in the memory 76 using the data 74, which may include information supplied to the server 50 by buyers, sellers, third party fund sources and the administrator accessing the transaction website of the server 50.

In one embodiment, the instructions 76 may further contain instructions that the processor 70 may execute to: analyze data relating to operations performed, such by a buyer or seller, on the transaction website in connection with a purchase transaction, and generate reports based on the analyzed data; provide for interfacing between a third party software application, such as an accounting application, and data 74 stored in the memory 72, such as purchase transaction information and financial information; and customize buyer or seller interactions with the transaction website, such as by implementing artificial intelligence technology that uses data representative of buyer or seller interactions with the transaction website, to improve the efficiency of buyer and seller interactions with the transaction website.

In addition to the operations illustrated in FIGS. 1-2, operations in accordance with a variety of aspects of the inventive method will now be described. It should be understood that the following operations do not have to be performed in the precise order described below. Rather, various steps can be handled in reverse order or simultaneously.

Figure 3:
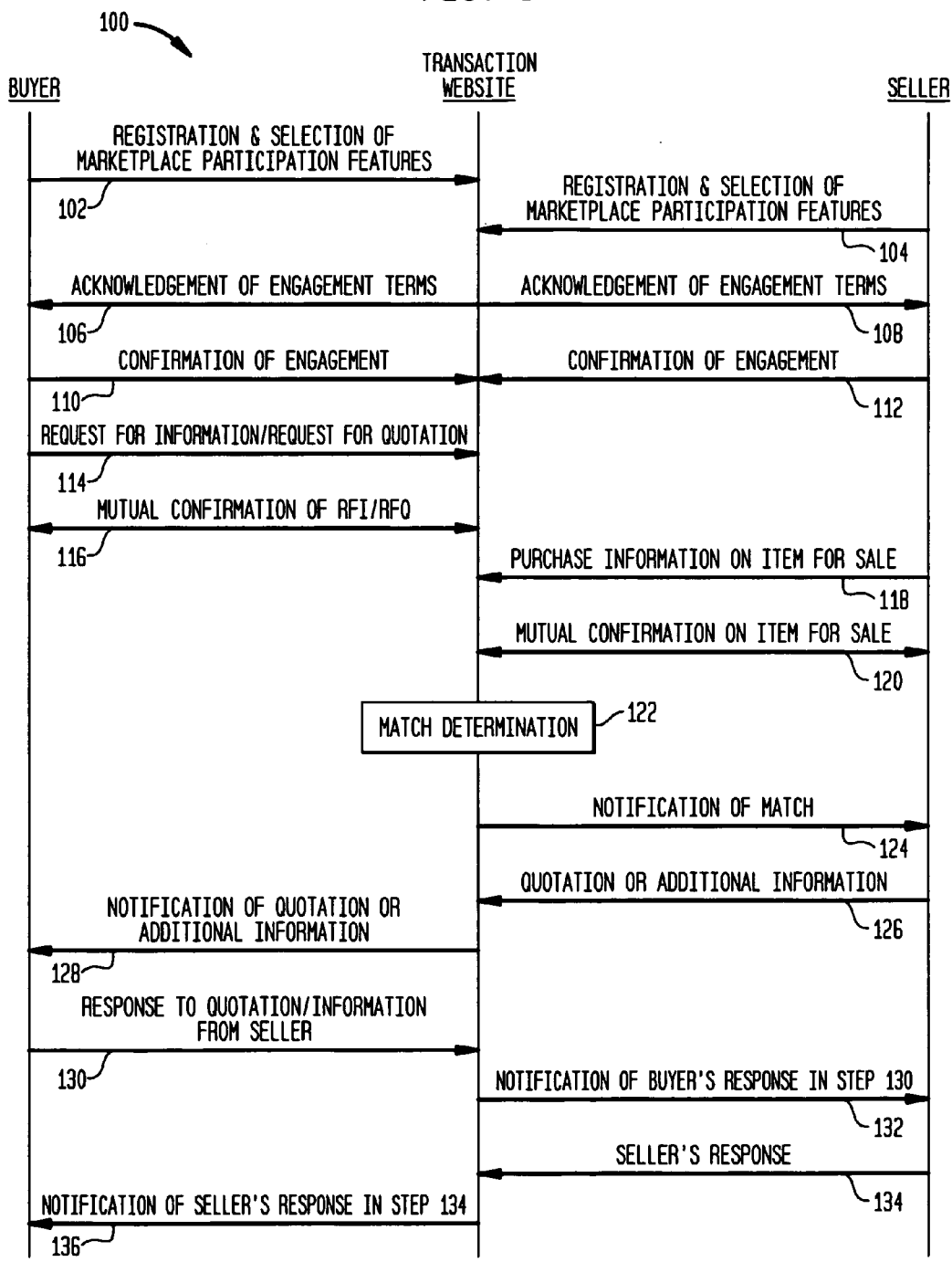
FIG. 3 is a flow diagram of a process in accordance with an aspect of the present invention.

In accordance with one aspect of the invention, a purchase transaction website of a server of a purchase transaction system may perform an exemplary purchase transaction process 100, as shown in FIG. 3, which facilitates purchase of an item using the transaction website, and where the purchase process may include a buyer and seller exchanging information with the server and the server providing services relating to the initiation and completion of a purchase transaction using the transaction website. For highlighting the features of the present invention, the process 100 is described below with reference to operations that may be performed by components of the exemplary system 10, as shown in FIGS. 1 and 2.

Figure 5:
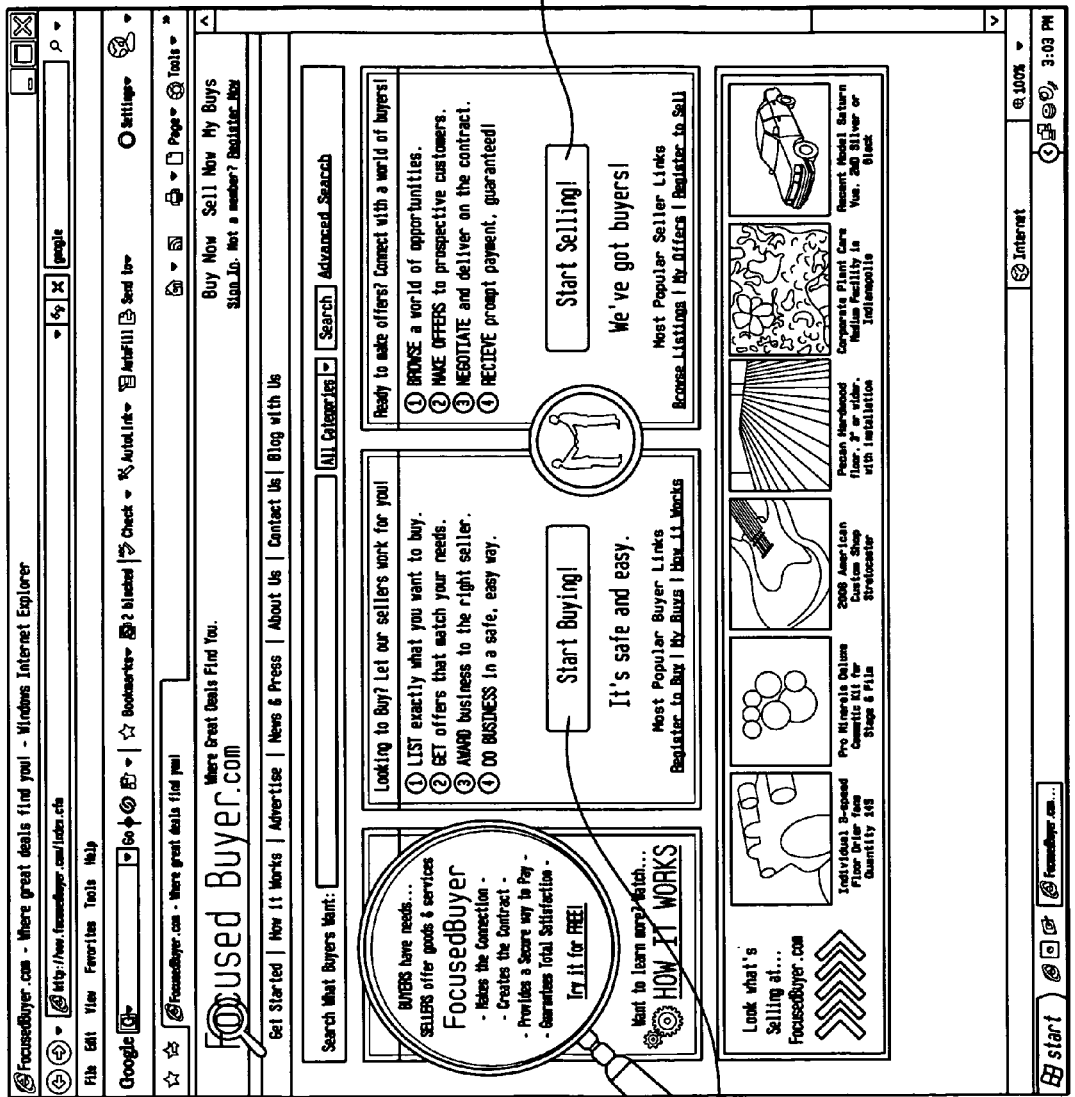

Referring to FIGS. 1-3, in step 102 an individual or entity interested in purchasing an item offered for sale on the transaction website may access the transaction website of the server 50 at the client computer 12, using browser software stored in the memory 22 of the computer 12. The potential purchaser may be, for example, any individual consumer, a business purchasing agent, government procurement personnel, etc. When the transaction website is accessed, the server 50 may provide that one or more webpages of the transaction website, on which information may be supplied to the server 50, and which describe the purchase transaction process performed, and related services such as Ebank services offered, by the transaction website, may be displayed on the display 30 of the computer 12. In one embodiment as shown in FIG. 5, a home webpage may initially be displayed including an icon 202 that may be clicked to commence registration with the transaction website as a buyer. Once a an individual or entity becomes a buyer, the buyer can purchase an item offered for sale on the transaction website after the buyer creates a listing for an item the buyer desires to purchase using the transaction website, for example, as described in detail in the text accompanying the description of step 114 of the process 100 shown in FIG. 3. During registration, the buyer may establish a password for accessing the transaction website and also supply contact information, such as a home address, telephone number(s), email address, etc.

In addition, desirably during registration in step 102, or after registration, the buyer may select transaction website marketplace participation features on a webpage of the transaction website, for example, from drop down menus. The participation features may set forth terms relating to purchase of an item by the buyer using the transaction website, and services the buyer may desire the transaction website to provide, such as services relating to the purchase of an item using the transaction website and Ebank services. The participation features selectable by a buyer may include: creating a listing on the transaction website for an item a buyer desires to purchase, where the listing includes information describing and useful for categorizing the desired item; creating an RFI and/or an RFQ for an item and supplying the RFI and/or RFQ to a seller of the item; access to a purchase database managed or monitored by the transaction website on which a listed item may be included; notifying a buyer of quotations (proposals)

by a seller(s) regarding a listed item; payment of a seller following satisfactory delivery of the purchased item to a buyer; an electronic payment service administered by the transaction website, as described in detail below, which may pay the seller using buyer funds held in a lockbox account of the transaction website; financial and banking-related services provided by the Ebank of the transaction website; and a buyer assistance program. The buyer assistance program, for example, may (i) provide that the transaction website negotiates with a seller in connection with a particular purchase transaction; (ii) establish a cooperative or consortium RFQ for multiple buyers who the transaction website identifies, from individual RFQs, as being interested in purchasing the same or similar item; and (iii) provide that the transaction website searches other Internet websites for a listed item, for example, if it is determined that a seller does not offer the listed item for sale on the transaction website.

In a further embodiment, the marketplace participation features selectable by a buyer may include the transaction website providing the following services: evaluating the quality of a listed item; providing a warranty on a purchased item; providing for mediation of a dispute between a buyer and a seller; buying process training; advising on a target price for an RFQ; auditing of sellers; and comparing features of items matched to a listed item.

In step 104, which may be performed before, during or after step 102, an individual or entity interested in offering an item for sale using the transaction website may access the transaction website of the server 50, using browser software stored in the memory 22 of the computer 14. Similarly as in step 102, when the transaction website is accessed in step 104, the transaction website may provide for display of the home web page, as shown in FIG. 5, on the display 30 of the computer 14, so that the individual or entity may register as a seller with the transaction website by clicking on an icon 204. During registration, a seller may establish a password for accessing the transaction website and also supply contact information, such as a home address, telephone number(s), email address, etc. After becoming registered, the seller may offer items for sale to buyers using the transaction website in response to a request for a quotation or information for a listed item created by a buyer using the transaction website.

Also during, or alternatively after, registration, the seller may select transaction website marketplace participation features relating to the sale of an item using, and services provided by, the transaction website. The participation features set forth the terms of how the seller can offer an item for sale using the transaction website, and services the seller may desire the transaction website to provide, such as in connection with the sale of an item using the transaction website and Ebank services. The participation features selectable by a seller may include: access to an RFI and/or RFQ; response to an RFI and/or RFQ with additional information describing, or a quotation (proposal) for purchase of, a listed item, respectively; access to, and inclusion of an item for sale in, a purchase database(s) managed or monitored by the transaction website; a seller assistance program managed by the transaction website, which may provide the seller with better opportunities for selling an item; automatic notification when the transaction website determines a match between a listed item and an item offered for sale by the seller; advertisement of an item offered for sale on the transaction website; the electronic payment service administered by the transaction website; acceptable payment mechanisms, such as credit cards or the electronic payment service of the transaction website; collection and reporting of data regarding purchase transactions completed using the transaction website; and financial and banking-related services provided by the Ebank of the transaction website.

In one embodiment, one or more of the marketplace features selectable by a buyer or seller may be provided by the transaction website at no charge, or for a predetermined fee. For example, if a buyer selects the marketplace feature of the transaction website negotiating with a seller, creating a consortium buying RFQ, or managing all aspects of the purchase process for a listed item, the fee may be 5-10% of the purchase price of the listed item.

In steps 106, 108, after a buyer and seller supplies the transaction website with marketplace feature selections, the transaction website may transmit an acknowledgement message to the buyer and seller, respectively, which sets forth the terms of engagement of the buyer and seller with the transaction website. The acknowledgement message requires the buyer or seller to confirm the terms of the engagement with the transaction website, which terms include the selected marketplace features, and rules and conditions set forth by the transaction website regarding use of the transaction website for completing a purchase transaction.

The buyer and seller in steps 110 and 112, respectively, may transmit a confirmation to the server 50 that serves to contractually bind each with the transaction website in accordance with the terms of engagement. The processor 70 may store the terms of the engagement of buyers and sellers in the data 74 of the server 50.

After the buyer and seller confirm engagement with the transaction website, the buyer may use the transaction website to pursue the purchase of an item of interest, and the seller may use the transaction website to offer an item for sale to buyers.

Figure 6:
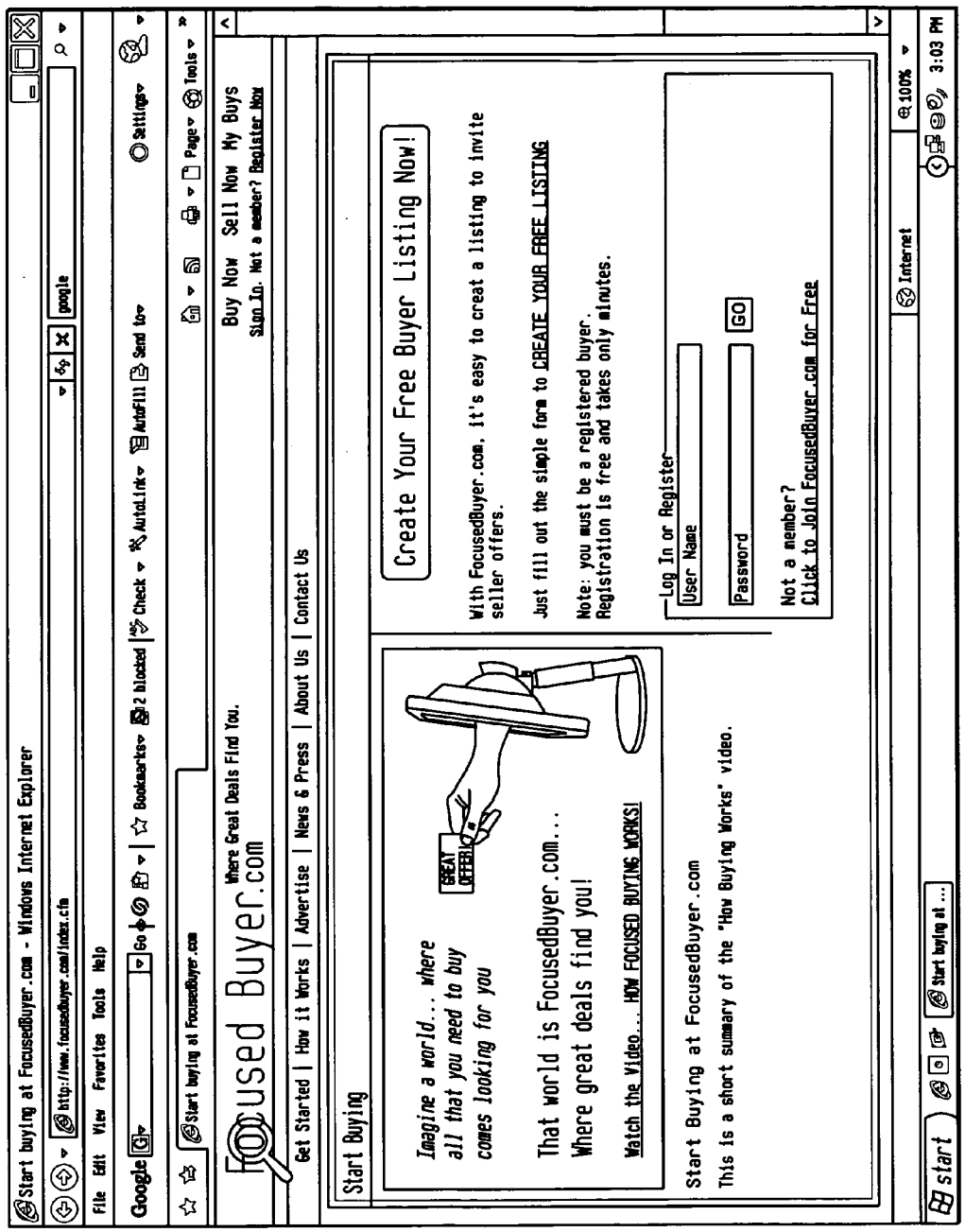
Figure 7A:
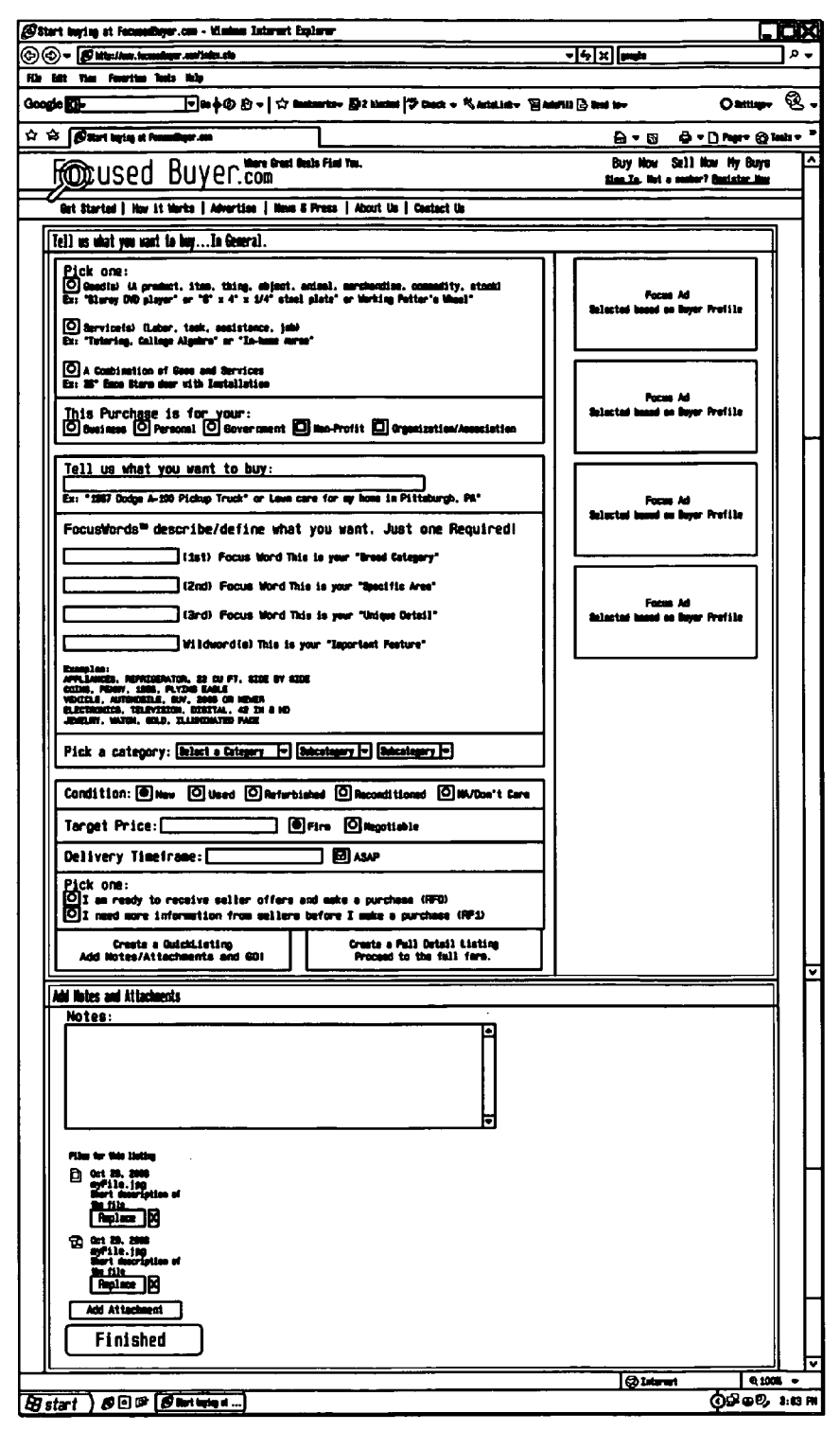
Figure 7B:
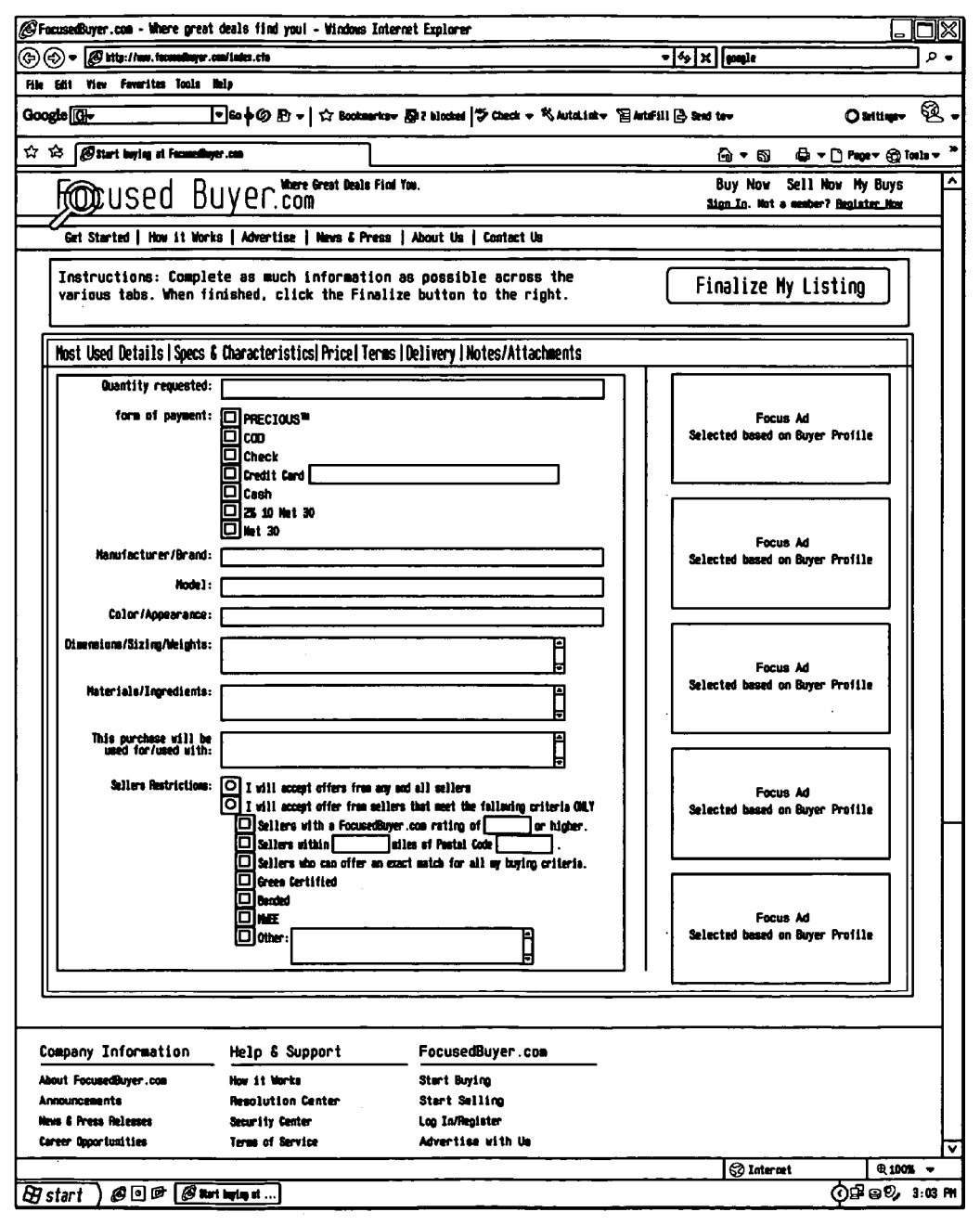

In step 114, which the buyer may perform anytime after confirming engagement with the transaction website, the buyer may access a logon webpage of the transaction website, such as shown in FIG. 6, and then be forwarded to webpages, as shown in FIGS. 7A-7B, where the buyer may supply information to create a listing for an item the buyer is interested in purchasing. Referring to FIGS. 7A-7B, the buyer may supply information such as: whether a good or service is of interest; words describing the item; category and subcategory identifications for the item, based on the options supplied by the transaction website and where the identifications index the listed item so that the processor 70 may match the listed item with an item offered for sale by a seller and also indexed using the same identifications; a target price, and whether such price is firm or negotiable; a target delivery date; quantity of the item requested; the manufacturer, brand, model number, and color, as applicable, of the item (when the item is a good); criteria on a seller from which the buyer would accept an quotation for sale, such as a bonded seller, a seller having purchase process criteria identical to that of the buyer; form of payment, which may include credit card, check and the electronic payment service of the transaction website; whether an RFI should be sent to a seller, such as if the buyer desires to receive additional information from a seller on a listed item before receiving a quotation; and whether a seller should be notified of an RFQ for a listed item, such as if the buyer is ready to receive quotations from sellers and purchase the listed item using the transaction website. The information supplied by the buyer during creation of a listed item is stored by the processor 70 in the data 74 of the server 50.

In step 116, the server 50 may cause display of a webpage of the transaction website on the display 30 of the computer 12 summarizing the information supplied by the buyer to create the listed item. The buyer, in turn, may confirm with the transaction website that the summary in-formation for the listed item is correct.

In step 118, which the seller may perform anytime after confirming engagement with the transaction website, the seller may access the transaction website and supply information describing an item the seller desires to sell using the transaction website. Similar to the information the buyer may supply in step 114 to create a listed item, the seller may supply information such as: whether the offered item is a good or service; words describing the item; category and subcategory identifications, based on options supplied by the transaction; a target price, and whether such price is firm or negotiable; a target delivery date; quantity available; the manufacturer, brand, model number and color, as applicable, of the item (when the item is a good); form of payment, which may include credit card, check and the electronic payment service of the transaction website; and whether a seller should be notified automatically of a match of an RFI or RFQ for a listed item with an item offered for sale by the seller.

In step 120, the server 50 may cause display of a webpage of the transaction website on the display 30 of the seller's computer 14 summarizing the information the seller supplied on an item available for purchase using the transaction website. The seller, in turn, may confirm with the transaction website that the summary information is correct.

Figure 8:
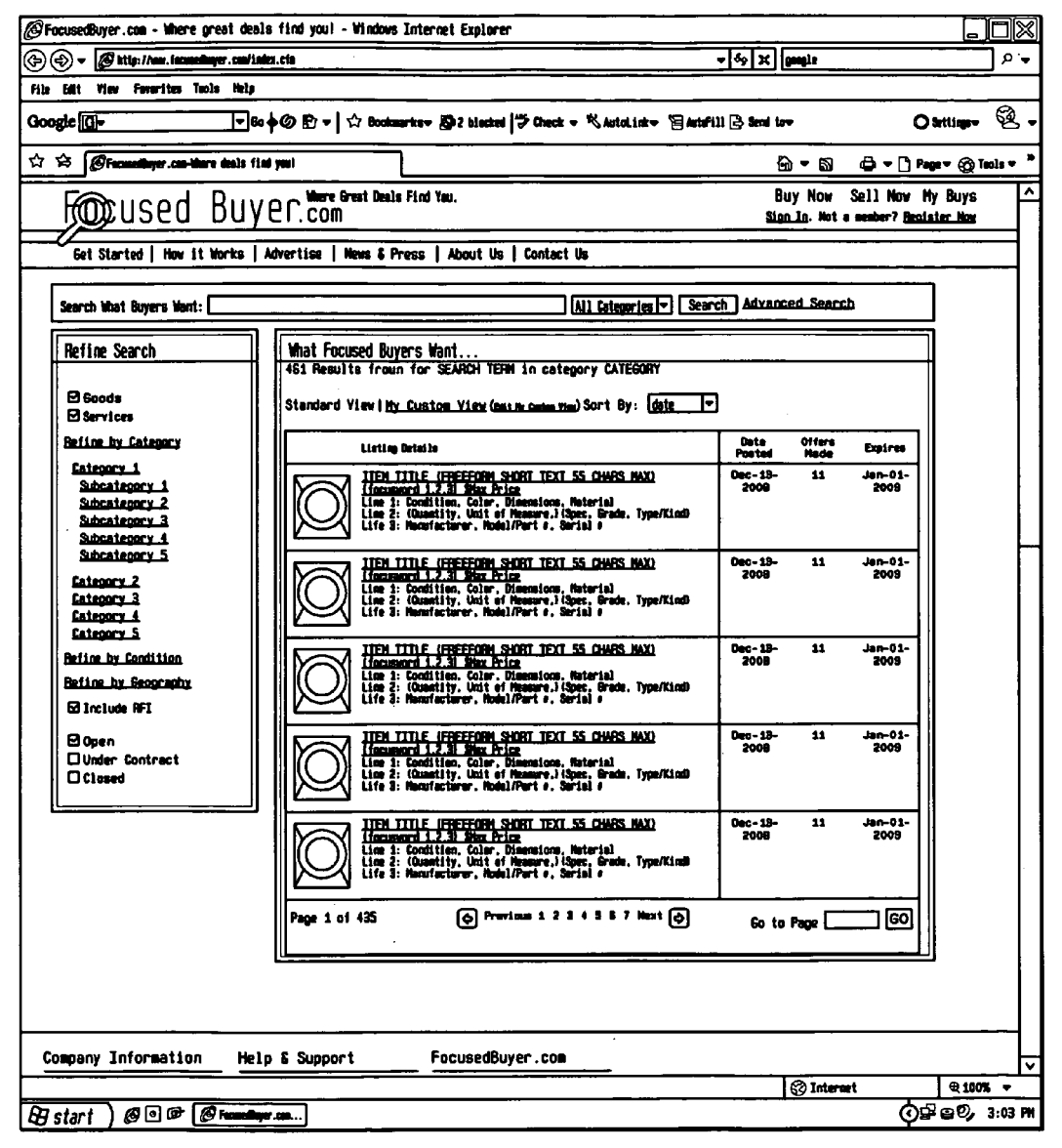

In one embodiment, a seller may access the transaction website and perform a search of the listed items to identify whether a particular item is a listed item, for example, where the seller may or may not have identified the item as being for sale in step 118. For example, referring to FIG. 8, a seller may search for a particular item among the listed items by supplying search words, and also the category and subcategory identifications that the transaction website uses to index listed items. In addition, the seller may search for a listed item according to whether an RFI and/or RFQ is included in the listed item information. As shown in FIG. 8, based on search criteria and/or category and subcategory identifications supplied by the seller, the processor 70 of the server 50 may search the data 74 of the memory 72 to identify listed item(s) having the same or similar descriptors and/or category and subcategory identifications as those supplied by the seller, and then provide for display of the identified listed items. In the event the seller determines that an identified listed item corresponds to an item the seller offers for sale using the transaction website, the seller may provide for transmission of a quotation for purchase, as discussed in detail below in connection with step 126.

For example, a buyer who desires to purchase a pair of sneakers may create a listed item including: descriptive information identifying brand, model number, color, size, etc.; the category identification "athletic footwear;" the desired payment price, quantity and payment method; and the acceptable forms of delivery. A seller, in turn, may access the transaction website and search for listed items using the category identification "athletic footwear," such that the processor 70 would retrieve the listed item of a pair of sneakers created by the buyer.

In accordance with another aspect of the invention, the transaction website may automatically determine whether a item being offered for sale by a seller matches a listed item created by a buyer, such as described in step 114, and then notify the seller of the match, such as by email. This automatic match determination and notification service may be provided to the seller, based on the marketplace participation features selected by the seller, such as in step 104 or anytime after the seller confirmed engagement with the transaction website.

In one exemplary embodiment of the automatic match service, in step 122 of the process 100 the processor 70 of the server 50 may determine whether one or more of the descriptors or category and subcategory identifications for a listed item are the same as the descriptors or category and subcategory identifications supplied by a seller for an item offered for sale on the transaction website. If yes, a match has been determined.

In step 124, upon determination of a match, the server 50 may automatically transmit an email to the matched seller(s) notifying such seller(s) that a match has been determined. The notification may include information identifying the item offered for sale by the seller for which the match has been determined, as well as other information relating to the match determination. The seller may then access the transaction website to obtain additional information about the listed item corresponding to the determined match, such as the buyer's terms and conditions for purchase of the listed item including target price, shipping method, payment settlement method, etc.

Continuing with the example of a listed item of a pair of sneakers, a seller of athletic footwear may receive an email notification indicating a match based on the category identification "athletic footwear," after which the seller may access the transaction website to obtain further information on the matched listed item.

In step 126, a seller may access the transaction website to submit a quotation responding to an RFQ, or provide additional information in response to a RFI, for a listed item, such as based on the match determination in step 122 or a search on the transaction website performed by the seller. The quotation may include price, a picture of the item, purchase terms which may be the same or differ from those supplied by the buyer for the listed item, return policy, shipping terms, payment terms and method, etc.

In step 128, the server 50 may automatically transmit an email to a buyer notifying the buyer that one or more quotations or additional information, respectively, has been received at the transaction website from one or more sellers with respect to a listed item of the buyer. In step 130, the buyer, such after receipt of a notification as described in step 128, may access the transaction website to review a quotation or additional information received for a listed item and supply responsive information on the transaction website.

Figure 9:
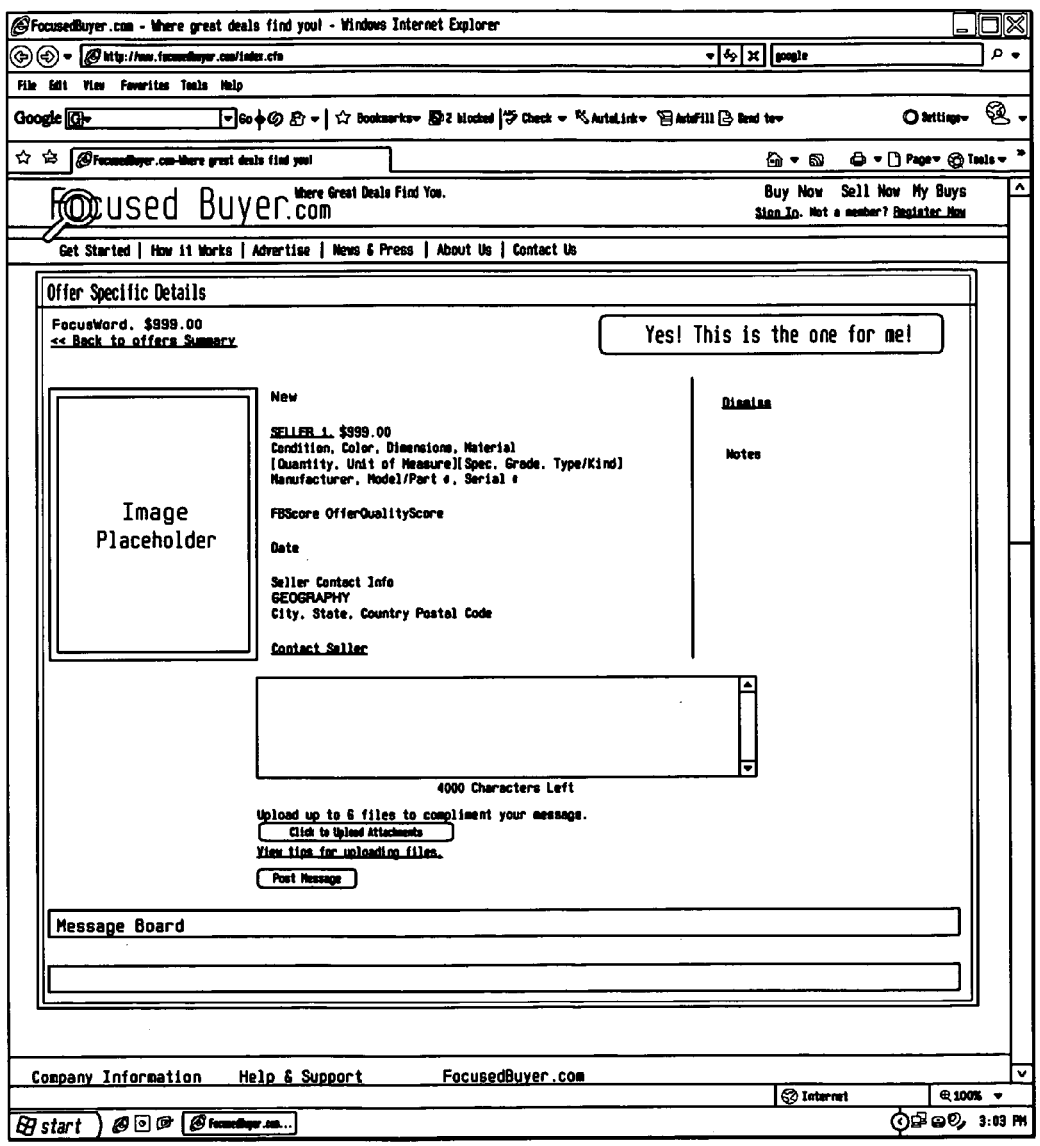

In one embodiment, the processor 70 of the server 50 may compile quotations or additional information received from sellers with respect to a listed item, and generate a summary report that a buyer who created the listed item may access on the transaction website. For example, the processor 70 may provide for display of a webpage on the computer 12 of the buyer which includes quotations of respective sellers in response to an RFQ for a listed item, where the format of the display allows for ease of comparison of the quotations. In a further embodiment, the server 50 may provide for display of a webpage, as shown in FIG. 9, summarizing the details of a quotation of a seller who the buyer selected from a webpage containing multiple quotations.

Figure 10:
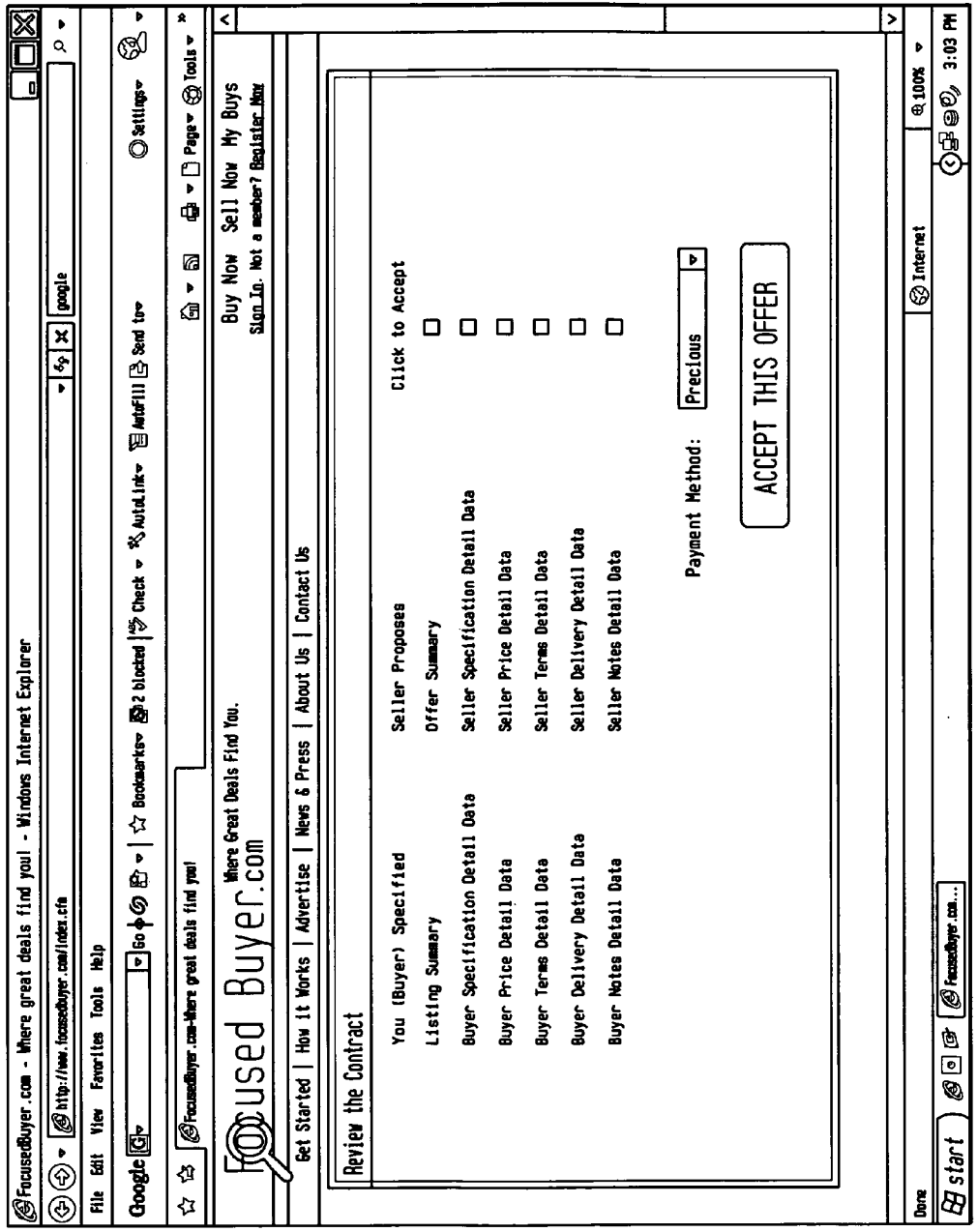

In one embodiment of step 130, the buyer may confirm that the terms of a quotation of a seller are accepted without any changes. For example, if the buyer decides that the terms of a quotation are acceptable, the buyer may submit a confirmation of the quotation to the transaction website, such as on a webpage as shown in FIG. 10.

In an alternative embodiment of step 130, the buyer may respond to a quotation by proposing different terms, such as an alternate delivery means, delivery date or payment method. For example, the buyer may require that the electronic payment service of the transaction website, as discussed in detail below, be used as the payment mechanism.

In still a further embodiment of step 130, the buyer may request that a seller who submitted a quotation or additional information provide further information on the item being offered for sale.

In step 132, after the buyer submits a response in step 130, the server 50 may automatically transmit an email to a seller notifying the seller of the response by a buyer to a quotation or additional information provided by the seller for a listed item in step 126.

In step 134, the seller, having received the notification in step 132, may access the transaction website and submit information to the transaction website that confirms acceptance of the quotation by the buyer, provides additional information requested by the buyer, or proposes alternative terms and conditions for a quotation.

The server 50, following the supply of information by the seller in step 134, in step 136 may then automatically transmit an email to the buyer notifying the buyer of the seller's response in step 134. Depending on the seller's and buyer's actions, steps 130, 132, 134 and 136 may continue to be iteratively performed until a buyer and a seller agree upon the terms and conditions of a contract for purchase of the listed item.

When a buyer accepts a quotation, the quotation becomes a final purchase contract between the seller and buyer. The terms and conditions of the contract include those relating to use of the transaction website confirmed in steps 110 and 112, and may include delivery and payment terms agreed to during negotiations between the buyer and seller.

In one embodiment, after a final purchase contract for a listed item has been entered into by a buyer and seller, the processor 70 of the server 50 may provide that shipping and payment information status for the contract may be accessed on the transaction website by the seller and the buyer. The shipping and payment information may include, for example, date of shipment, shipping invoice number, date of receipt, results of buyer's inspection of the received item, for example, whether the received item has visible damage or defects, and date of release of funds by buyer for payment to seller. In one embodiment, the terms of engagement with the transaction website may require a seller and buyer to timely supply the server 50, via the transaction website, status information concerning delivery and payment for a contract entered by the buyer and seller.

In one embodiment, the transaction website may provide a webpage on which a buyer supplies an indication, such as by clicking upon an icon, that the item has been received and is acceptable. Upon providing such indication, the transaction website may provide for release of payment of the contract price to the seller, for example, based on a communication exchange with a third party funds source at the computer 16, or by use of the electronic payment service of the transaction website, as described in detail below.

In a further embodiment, in the event of a dispute between a buyer and seller regarding a final purchase contract, the buyer and seller may indicate the existence of the dispute to the transaction website, such as on a webpage for reporting contract disputes. Based on the determination by the processor 70 of the server 50 that a dispute has been reported, the transaction website, in turn, may electronically notify the administrator at the computer 18. The dispute may undergo a mediation process using an independent mediator, where the administrator at the computer 18 facilitates exchange of information among the buyer, seller and the mediator and retrieval of information relating to the disputed contract from the data 74 of the server 50. For example, the mediation process may be pursuant to the negotiated terms of the contract or the marketplace participation features selected by the buyer and seller, which provide that a mediation decision is binding on both the seller and buyer. In one embodiment, the mediation process may provide for entry of a settlement between the seller and buyer within a predetermined period from commencement of the mediation.

In one embodiment, after a buyer decides that a item received for a purchase contract is acceptable, the buyer may complete a transaction receipt and acceptance form on the transaction website. In a further embodiment, the buyer and the seller may access the transaction website to supply feedback on their purchase experience using the transaction website. The feedback may include whether the seller delivered the item on the promised date, without damage, and how well the delivered item corresponded to the description provided by the seller. The processor 70 of the server 50 may use such feedback information, for example, to determine a satisfaction rating for a seller. In one embodiment, the processor 70 may include the satisfaction rating of the seller with the quotation or other information of the seller that a buyer may access on the transaction website.

In accordance with a further aspect of the present invention, the transaction website may provide an electronic payment service in which the transaction website controls release to a seller of funds of a buyer held-under the control of the transaction website ("PR service"), based on agreement of the buyer and seller to participate in such service. In one embodiment of the PR service, the transaction website may control release of the held buyer's funds to pay the contract price to the seller in full, partially or not at all, based on the circumstances of the delivery of the item purchased under the contract entered into between the buyer and seller. The PR service may pay the full contract price from the held funds to the seller when the buyer indicates that the contract item was received in satisfactory condition. Alternatively, in the event the buyer at least partially rejects delivery of the item or a dispute arises between a buyer and a seller, the PR service may pay a portion or none of the contract price from the held buyer funds to the seller, in accordance with a settlement between the buyer or seller or a decision of a mediation which is provided as part of the PR service.

In one embodiment, the PR service may be performed using the Ebank of the transaction website, and use available data encryption and firewall technology to protect the security of financial data relating to a purchase contract stored at the server 50 or communicatively exchanged between the server 50 and a remote communication device, such as the clients 12, 14, 16 and 18.

Figure 4:
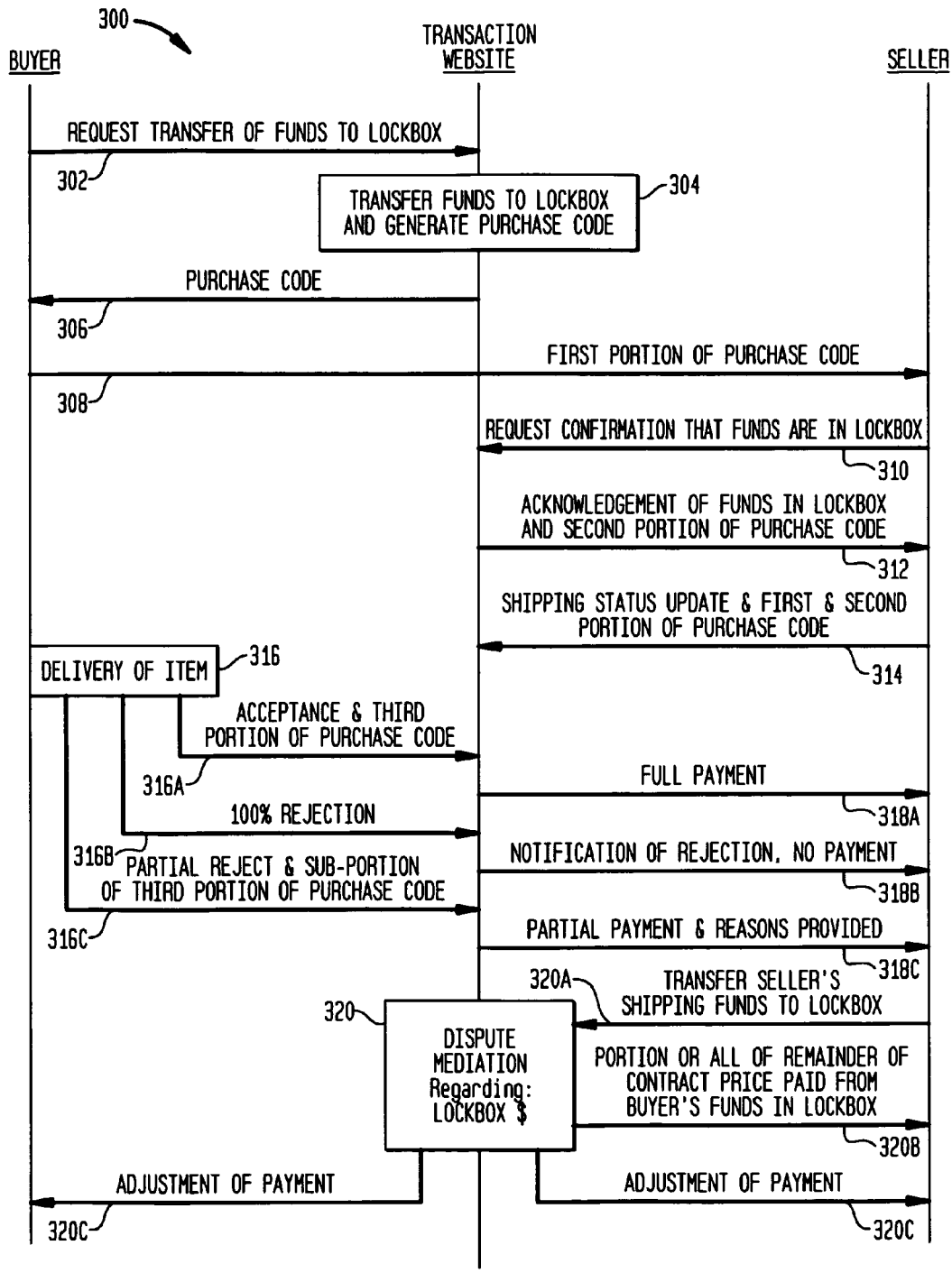
FIG. 4 is a flow diagram of an exemplary payment process in accordance with an aspect of the present invention.

FIG. 4 illustrates an exemplary PR service process 300 that the processor 70 of the server 50 may perform, in accordance with aspects of the present invention. In one embodiment, each step of the process 300 is performed substantially in real time, following receipt or retrieval of information needed to perform such step at the server 50.

Referring to FIG. 4, in step 302 the buyer may access a PR service webpage on the transaction website, and submit a request for transfer of an amount equal to the price of a purchase contract from an account the buyer opened with the PR service, the Ebank of the transaction website or from a third party source, such as credit card account, to a holding account ("lockbox account") administered by the PR service.

In step 304, the server 50 may determine whether funds equal to the amount of the contract price are in the buyer's account with the PR service or Ebank, or a third party funds party source identified by the buyer would authorize an electronic transfer of the amount to the transaction website. If yes, an amount equal to the contract price may be electronically transferred to the lockbox account from an account of the buyer administered by the transaction website, or the third party source. After the funds of a buyer are transferred to the lockbox account in connection with a contract, the transaction website holds such funds in the lockbox account and controls distribution of all or a portion of the funds to the seller for the contract, which includes payment of the seller in full or return of all or portion of the funds to the buyer, as discussed below.

In addition, after transfer of the buyer's funds to the lockbox account designated for satisfaction of a contract, in step 304 the processor 70 may assign a purchase code to the contract. The transaction website may use the purchase code for monitoring status of delivery of an item to a buyer and controlling payment or non-payment of the contract price from the buyer's funds in the lockbox account to the seller. The controlled distribution of the held funds may depend upon information the buyer may supply to the transaction website indicating that the seller satisfied the obligations under the contract, or upon the terms of a settlement or mediation decision regarding the contract in the event of a contract dispute. In one embodiment, the processor 70 in step 304 may assign a unique 16 digit alpha numeric purchase code to a contract.

In step 306, the server 70 may transmit the purchase code to the buyer by email. Then in step 308, the buyer may transmit, directly to the seller via email, a first portion of the purchase code, such as the first eight (8) digits of the sixteen (16) digits of the purchase code. In one embodiment, the email may include a website link that requires entry of a pin number to reveal the purchase code. In such embodiment, the server 50 may maintain a webpage corresponding to the website link, and separately transmit to the seller an email including the pin number.

In step 310, the seller, after receipt of the first 8 digits of the purchase code from the buyer, may access a PR service webpage of the transaction website and request a confirmation that funds of the buyer equal to the contract price are being held in a lockbox account. In step 312, in response to the seller's request in step 310, the server 50 may transmit an email to the seller confirming that the funds of the buyer for payment of the contract price are being held in a lockbox account and including a second portion of the purchase code, such as the next four digits, e.g., digits 9, 10, 11 and 12, of the purchase code.

In step 314, the seller may access the PR service webpage of the transaction website, after shipping the item of the contract item, and enter shipping status information for the contract together with the purchase code portions already received, such as the first twelve digits of the purchase code. The server 50 desirably may continuously update the shipment status information for a particular contract, in accordance with the purchase code information received from the seller in step 314 which the processor 70 compares with the purchase code generated in step 304 to identify activities, e.g., shipment of an item, for a purchase contract. The buyer may access such shipment status information on the transaction website, as described above in the process 100.

In step 316, the item under the contract is delivered to a buyer. At the time of delivery, or within a predetermined time thereafter, a buyer may decide that the item is satisfactory and accept the item, or alternatively, completely or partially reject the item, for example, if the delivered item is damaged, defective or does not conform precisely to the description of the item in the contract.

After the buyer decides to accept or partially or completely reject the delivered item, in step 316 the buyer may access the PR service webpage of the transaction website and supply information indicating (i) acceptance (step 316A); (ii) full rejection (step 316B); or (iii) partial rejection (step 316C).

In the event of acceptance, the buyer in step 316A also supplies the remaining portion of the purchase code, such as the last four digits of the purchase code. Upon receipt of the indication of acceptance and the remaining portion of the purchase code, the processor 70 of the server 50 in step 318A may electronically transfer, from the funds of the buyer held in the lockbox account for the contract, an amount equal to the price of the contract to an account of the seller. The account of the seller may be, for example, with the Ebank of the transaction website, or a third party funds source.

Alternatively, the buyer in step 316B may indicate a full rejection. Based on such indication in 316B, the server 50 in step 318B may transmit a email to the seller providing notification of such rejection, and no payment is made to the seller from the lockbox account.

In another alternative, the buyer in step 316C may indicate a partial rejection. When such indication is provided, the buyer also must supply a first sub-portion of the remaining portion of the purchase code, such as two digits of the last four digits of the purchase code, e.g., the $13^{th}$ and $14^{th}$ digit of the purchase code. Based upon receipt of a first sub-portion of the remaining portion of the purchase code, the server 50 in step 318C may transfer a portion of the buyer's funds from the lockbox account, such as an amount equal to 90% of the contract price, to an account of the seller. The partial payment to the seller may be in accordance with terms and conditions of the contract regarding partial rejection of a delivered item by the buyer.

It is to be understood that other techniques of using a purchase code or an alternative form of coded information for controlling transfer of information, such as relating to funds in the lockbox account or other financial information, may be implemented by or applied to the present invention, such that release of payment by the transaction website from the held funds to a seller may occur only upon receipt of expected code information at the transaction website.

In one embodiment, the terms of engagement with the transaction website may provide that, in the event a dispute arises between the buyer and seller regarding the delivered item or other provisions of a purchase contract, the buyer and seller may indicate on the PR service webpage of the transaction website that the contract is in dispute. In addition, after either the buyer or seller indicates the existence of a contract dispute, the buyer and seller may then have a predetermined time, such as 30 days, to resolve the dispute between each other. Further, if the parties do not resolve a dispute within such time period, the transaction website may provide for mediation of the dispute by an independent third party mediator who is not affiliated with the transaction website, or the buyer or seller involved in the dispute.

In one embodiment where a mediation is initiated in connection with the PR service, in step 320 the administrator may access the transaction website and obtain from the server 50 information regarding the contract, and also the circumstances of the dispute as supplied by the buyer and seller, and supply such information electronically to the mediator, buyer or seller, as suitable. The mediator may resolve the dispute within a predetermined time, such as 30 days, and the resolution is binding on the parties to the contract. In one embodiment, the buyer and seller may submit alternative settlement proposals for consideration by the mediator, which would be included in the dispute information the administrator supplies to the mediator. The administrator may supply the terms of the resolution to the server 50. Based on the terms of the resolution, the processor 70 may control further payment of the seller from, or return to the buyer of, the funds in the lockbox account for the contract.

If the decision of the mediation is return of the item, the server 50 may electronically notify the seller of such decision. The seller, in turn, in step 320A must authorize transfer, to the lockbox account associated with the contract, funds from an account of the seller, such as in account in the Ebank or available from a third party funds source, in an amount equal to the cost of return shipping of the item from the buyer to the seller. Consequently, the buyer is assured that the rejected item can be returned to the seller at no cost to the buyer. The server 50 may transfer the return funds from the lockbox account to an account of the buyer account, such as in the Ebank, when the seller confirms receipt of the returned item.

Alternatively, if the mediator finds for the seller, the server 50 in step 320B may transfer all or a portion of the funds of the buyer remaining in the lockbox account for the contract to an account of the seller, such that the seller is paid the full contract price.

In another alternative where the mediator finds for the buyer in part, such that an existing deduction or some portion of the deduction of the contract price is maintained, the server 50 in step 320C may transfer a portion of the funds of the buyer in the lockbox account to an account of the seller or buyer, accordingly.

Consequently, the PR service which includes a mediation provision may provide that, if the seller fails to respond to a buyer's complaints regarding a delivered item, after mediation is concluded, the received item does not become the financial burden or responsibility of the buyer.

Advantageously, the transaction website permits a buyer to receive specific information concerning a specific item available for purchase over a communication network, without the buyer being inundated with unwanted advertisements for items not of interest to the buyer, and without restricting the buyer to the use of specific, targeted selling search engines. In addition, the buyer may identify various purchasing requirements, such as a target price and terms of sale and payment, which facilitate a negotiation process with a seller to obtain a purchase contract. The information for completing a purchase transaction is always available to buyers and sellers on the transaction website, thereby reducing or eliminating many administrative steps typically associated with an on-line purchase transaction. In addition, a seller using the transaction website advantageously may have direct access to all potential purchasers, and not have to be concerned about being excluded from many search engines or having a very low priority or remote location in a popular search engine.

In addition, the PR service of the transaction website advantageously provides that a buyer can securely purchase an item using the transaction website, without regard to the seller's integrity, because the funds of the buyer may be controllably held by the transaction website, such as in a lockbox account, until the buyer's satisfaction is achieved. The buyer has a high level of confidence that an item to be received under a contract is as expected, because the PR service will not release the held buyer's funds for payment of the seller until the buyer provides an authorization, such as within a predetermined time frame, or a settlement or mediation decision is reached.

Further, sellers may be provided with secure selling opportunities by using the PR service provided by the transaction website. The PR service of the transaction website provides that a seller, who receives funds from the lockbox account for satisfying a purchase transaction entered into using the transaction website, does not have access to any sensitive financial information about the buyer, and that the seller has confidence that the buyer has sufficient funds to pay for the purchased item, such as prior to delivery of a good or performance of a service. Thus, the PR service may provide a secure, simple and standardized process for completing a purchase transaction using the transaction website, where buyers are protected against seller fraud in an on-line purchase transaction and also sellers may be confident that full payment will be received upon satisfactory delivery of the item of a contract to a buyer.

In one embodiment, the transaction website may not require a seller to pay a base participation cost or transaction fee. Consequently, prices for items available for sale on the transaction website may be lower, such that both the buyer and seller benefit. In a further embodiment, the transaction website may require a seller to pay a predetermined fee per registration year, such as after the first year of registration which is at no charge.

In addition, the transaction website may become very attractive to sellers, by becoming known for attracting financially able and likely buyers to a marketplace where a substantial percentage of listed items eventually are purchased. Further, the consortium buying program of the transaction website provides that buyers of like goods or services may maximize their purchasing power and leverage, while at the same time offering sellers the benefits of a large-scale transaction.

In a further embodiment, the Ebank of the transaction website may issue printed or electronic checks or the like ("lockbox checks") that may be used to draw from funds held in an account of the lockbox of the transaction website. Each lockbox check, which may include a unique code, may be used to pay for a listed item purchased under a contract entered into using the transaction website.

In one embodiment, a lockbox account may be established with the funds of an individual or entity not registered to buy or sell an item using the transaction website. In such embodiment, the lockbox checks may be used to pay ordinary household bills, retail purchases and consumer-to-consumer purchases, where the transaction website securely transfers funds from the lockbox to a third party having an arrangement with the transaction website for exchanging financial information and payments in connection with a commercial transaction.

In a further embodiment, the Ebank of the transaction website may issue a gift card, gift certificate, voucher or the like ("lockbox card") having a value corresponding to an amount transferred to a lockbox account from an account in the Ebank. The individual using the lockbox card may or may not be registered with the transaction website. The server 50 holds funds equal to the current amount of the lockbox card in the corresponding lockbox account, with identifying information, such that an amount not greater than the amount remaining for the lockbox card may be transferred from the lockbox account to a seller, or another individual or entity, for example, a retail or brick and mortar store, not registered with the transaction website and having an arrangement with the Ebank to provide for use of the lockbox account to pay for purchase of an item. In a further embodiment, the funds of the lockbox card may be transferred to another account, such as of a charitable or academic institution or established by an individual(s) with a business entity or other entity, such as a wedding registry, travel, scholarship, college fund account, where the owner or manager of the account has an arrangement with the Ebank to receive directed transfers from the lockbox account in connection with use of the lockbox card.

In a further embodiment, the transaction website may transmit an electronic voucher ("lockbox voucher"), which is representative of an amount transferred to a lockbox account. The lockbox voucher may include coded information, such as barcodes, containing identifying information for electronically processing a transaction using a cell phone, computer or like communication device. To redeem the electronic voucher, the holder of the communication device presents to a retailer records including the coded information, which was electronically transmitted from the server 50 to the communication device. In an alternative embodiment, the lockbox voucher is a printed document which is physically presented to a retailer. The retailer may enter the presented coded information, manually or by scanning, into a computer, such as similar to a client computer described above, and transmit the coded information and the amount of a purchase to be completed using the lockbox voucher to the transaction website. The server 50 at the transaction website verifies that the lockbox voucher code corresponds to a lockbox account and that the amount of the purchase does not exceed the amount held in the corresponding lockbox account. If such conditions are satisfied, the server 50 may release the amount of the purchase from the lockbox account directly to the retailer's automated banking routing, and transmit a communication message to the retailer's computer confirming such release.

In a further embodiment, a service similar to the PR service described above for the process 300 may be performed when the lockbox card or lockbox voucher is used to pay for a purchase of an item from an individual or entity not registered as a seller with the transaction website.

In one embodiment, the transaction website may charge a fee, or not charge a fee, each time a purchase transaction is completed by transfer of funds from a lockbox account to an account of an individual or entity not registered with the transaction website. In an alternative embodiment, the transaction website does not charge a fee upon transfer of funds from a lockbox account to an account of an individual or entity not registered with the transaction website, so long as the not registered individual or entity participates in some manner on the transaction website, such as by advertising on the transaction website.

In one embodiment, the transaction website may include advertisements, such as banner advertisements or pop-up advertisements, on selected webpages. The webpages may be selected by the processor 70 in accordance with the characteristics of the listed items displayed on the page. A fee may be charged, such as based on display of, or number of clicks on, the advertisement.

In a further embodiment, the Ebank of the transaction website may pay an account holder, such as a buyer or seller, interest, participation rewards and ownership rewards, based on revenue generated by the transaction website. For example, the Ebank of the website may distribute revenue generated from advertisements on the transaction website, on a proportional basis, into the Ebank accounts of buyers and sellers. In addition, the Ebank may pay interest while the funds of a buyer are held in a lockbox account of the transaction website.

In another embodiment, the Ebank may operate to loan money to buyers having an account with the Ebank.

In a further embodiment, an individual or entity who desires to learn about the operation and purchase transaction services provided by the transaction website, without registering with the website ("browser"), may be provided with access to portions of the transaction website. The browser, who may be a potential purchaser, or an individual or entity interested in offering for sale or advertising an item on the transaction website, cannot purchase, sell or advertise an item using the transaction website, until registration with the transaction website is completed.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method of buying and selling goods and/or services, including the steps of:
  a) providing a transaction website including a computerized server having a memory, said website:
    i) facilitating registration of prospective buyers of goods and/or services on said server memory;
    ii) facilitating registration of prospective sellers of goods and/or services on said server memory;
    iii) said buyers and sellers being unaffiliated with operators of said server;
  b) storing in said memory a listing of goods and/or services provided by prospective buyers that said prospective buyers wish to purchase but have not as yet located from a seller;
  c) storing in said memory seller offer responses to listings of specific goods and/or services buyers wish to purchase, said offer responses responding to respective listings of goods and/or services previously provided by prospective buyers;
  d) matching buyers and sellers based upon goods and/or services buyers wish to buy which sellers have available to sell, sellers being restricted on said transaction website solely to (1) responding to buyer listings of goods and/or services they wish to purchase, and (2) advertising general categories of goods/services they sell;
  e) a buyer using said website to negotiate a price for goods and/or services with a seller;
  f) a buyer using said website to negotiate a contract for purchase of said goods and/or services offered by a seller;
  g) arranging via said website payment terms, and delivery terms where applicable; and
  h) said website controlling flow of payments from buyer to seller pursuant to said contract;
  i) whereby buyers purchase goods and/or services from sellers while participating in (a) setting of prices through negotiation and (b) determining other terms and conditions essential to purchase of goods and/or services.

2. The method of claim 1, further including the step of facilitating communications between buyer and seller within the transaction website with respect to issues concerning, but not limited to, buyer listings, seller offers, buyer contract offers, negotiation and performance of contracts and ratings of sellers and buyers.

3. The method of claim 2, further including the step of archiving said communications within said memory for future access.

4. The method of claim 1, wherein said prospective buyers comprise prospective grouped buyers.

5. The method of claim 1, said seller advertising step including the step of providing a way to communicate with a seller.

6. The method of claim 5, further including the step of, prior to said advertising step, registering prospective advertisers of goods and/or services.

7. The method of claim 1, further including the step, in said transaction website, of managing all aspects of performance of contracts entered into by registered buyers and sellers.

8. The method of claim 1, further including the step of providing access to said transaction website for employers of buyers and sellers to facilitate monitoring of activities of employees who are buying and selling on behalf of their employers on said transaction website.

9. The method of claim 7, further including the step of resolving, on said transaction website, disputes between contracting buyers and sellers.

10. The method of claim 9, wherein said resolving step includes the step of mediating said disputes.

11. The method of claim 10, said resolving step further including the step of entry into final and binding arbitration.

12. The method of claim 1, wherein said arranging step includes the step of providing secure means for facilitating transfer of funds pursuant to performance of contract terms by buyers and sellers.

13. The method of claim 1, further including the step of providing templates on said transaction website that may be filled in by buyers and sellers to facilitate conducting of transactions.

14. The method of claim 13, wherein said templates include forms including for creation of listings of goods and/or services (a) for making offers by sellers where said offers are automatically sent to and attached to buyers' listings, and/or (b) which buyers wish to purchase; forms for creation of contracts, forms for registering buyers, sellers and advertisers, and forms for non-disclosure agreements.

15. The method of claim 1, wherein said matching step includes the step of privately targeting sellers of goods and/or services by buyers wishing to purchase specific goods and/or services through said transaction website from registered sellers commonly known to supply such goods and/or services.

16. The method of claim 1, further including the step of providing on said transaction website ability of registered buyers and sellers to download and save information concerning transactions into which they have entered, and concerning goods and/or services they have either listed for what buyers want to purchase, or for what sellers have interest in selling, to provide offers, including quotations and proposals, against listings of buyers.

17. A system for buying and selling goods and/or services, comprising:
   a) a transaction website including a computerized server having a memory, said server being in communication with prospective buyers and prospective sellers and:
      i) receiving inputs from prospective buyers of goods and/or services, said inputs facilitating registration of said prospective buyers of goods and/or services on said server memory;
      ii) receiving inputs from prospective sellers of goods and/or services, said inputs facilitating registration of said prospective sellers of goods and/or services on said server memory;
      iii) said buyers and sellers being unaffiliated with operators of said server;
   b) a listing of goods and/or services provided solely by prospective buyers and stored in said memory that said prospective buyers wish to purchase but have not as yet located from a seller;
   c) seller offer responses to listings of specific goods and/or services buyers wish to purchase, stored in said memory, said offer responses responding to respective listings of goods and/or services previously provided by prospective buyers;
   d) said computerized server matching buyers and sellers based upon goods and/or services buyers wish to buy which sellers have available to sell, said server restricting sellers on said transaction website solely to (1) responding to buyer listings of goods and/or services they wish to purchase, and (2) advertising general categories of goods/services they sell;
   e) said website permitting a buyer to negotiate a price for goods and/or services with at least one seller;
   f) said website permitting a buyer to negotiate a contract for purchase of said goods and/or services offered by at least one seller;
   g) said website arranging payment terms, and delivery terms where applicable; and
   h) said website controlling flow of payments from buyer to seller pursuant to said contract;
   i) whereby buyers purchase goods and/or services from sellers while participating in (a) setting of prices through negotiation and (b) determining other terms and conditions essential to purchase of goods and/or services.

18. The system of claim 17, further including facilitating communications between buyer and seller within the transaction website with respect to issues concerning, but not limited to, buyer listings, seller offers, buyer contract offers, negotiation and performance of contracts and ratings of sellers and buyers.

19. The system of claim 18, further including said memory archiving said communications within said memory for future access.

20. The system of claim 17, wherein said prospective buyers comprise prospective grouped buyers.

21. The system of claim 17, said server facilitating communications between a seller and buyers.

22. The system of claim 21, wherein said communications are with a registered seller.

23. The system of claim 17, managing, in said transaction website, all aspects of performance of contracts entered into by registered buyers and sellers.

24. The system of claim 17, further providing access to said transaction website for employers of buyers and sellers to facilitate monitoring of activities of employees who are buying and selling on behalf of their employers on said transaction website.

25. The system of claim 23, further including resolution of disputes between contracting buyers and sellers in said transaction website.

26. The system of claim 25, wherein said resolution of disputes includes mediating said disputes.

27. The system of claim 26, wherein said resolution of disputes further includes entry into final and binding arbitration.

28. The system of claim 17, wherein arranging of payment terms includes providing for secure transfer of funds pursuant to performance of contract terms by buyers and sellers.

29. The system of claim 17, further including providing templates on said transaction website that may be filled in by buyers and sellers to facilitate conducting of transactions.

30. The system of claim 29, wherein said templates include forms including for creation of listings of goods and/or services (a) for making offers by sellers where said offers are automatically sent to and attached to buyers' listings, and/or (b) which buyers wish to purchase; forms for creation of contracts, forms for registering buyers, sellers and advertisers, and forms for non-disclosure agreements.

31. The system of claim 17, wherein said matching by said computerized server includes privately targeting sellers of goods and/or services by buyers wishing to purchase specific goods and/or services through said transaction website from registered sellers commonly known to supply such goods and/or services.

32. The system of claim 17, further including providing on said transaction website ability of registered buyers and sellers to download and save information concerning transactions into which they have entered, and concerning goods and/or services they have (a) listed for what buyers want to purchase, or (b) for what sellers have interest in selling, to provide offers, including quotations and proposals, against listings of buyers.

\* \* \* \* \*